Inventor
H. G. L. Kolthoff

Patented Apr. 5, 1927.

1,623,686

UNITED STATES PATENT OFFICE.

HELGE GUSTAF LUDVIG KOLTHOFF, OF VANERSBORG, SWEDEN.

SELF-LOCKING NUT.

Application filed June 6, 1925, Serial No. 35,379, and in Sweden October 26, 1922.

This invention relates to a self-locking nut, consisting of two solid or undivided screw-threaded members, which are combined to a single nut with continuous screw-threads by one of the members (inner member) being slid from below into a recess, provided in the other member (outer member) and concentric with the screw-threaded opening. The height of the inner member is so adapted, that the bearing surface of the said member normally is located for a comparatively short distance outside the bearing surface of the outer member. The two members are connected by one or more lateral ridges provided on the one member engaging grooves provided in the other member, so that, while the nut is screwed on, the two members accompany one another, until the inner member is forced against the counter-member and stops, while the outer member is moved through a further distance, the members being by the movement between the said ridge and groove, thus effected, firmly fixed to one another and a dislocation between the screw-threads of the members longitudinally of their axis simultaneously effected, which results in the nut being locked to the screw-bolt.

Figure 1:
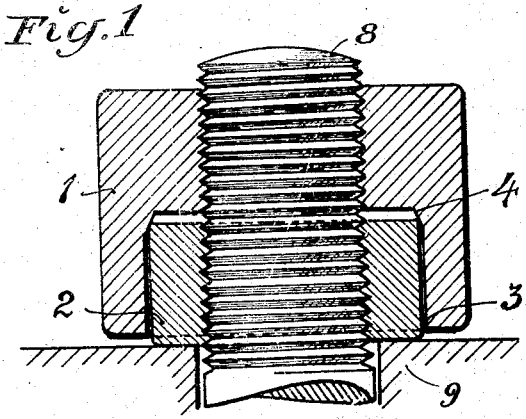
Figure 2:
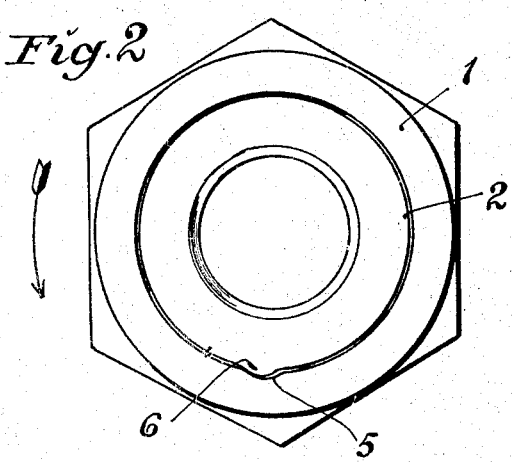
Figure 3:
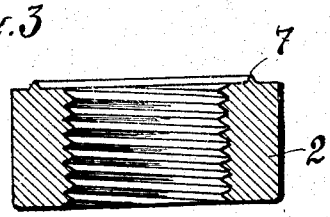

A form of the invention is shown as an example in the accompanying drawing, in which Fig. 1 is a vertical section of the self-locking nut and Fig. 2 shows the nut viewed from below. Fig. 3 illustrates a modification.

1, Figs. 1 and 2, is the outer member and 2 the inner member of the nut. Member 2 is slid into a recess 3 provided in the outer member and concentric with the screw-threaded opening of the nut, the slightest possible play being provided between the members. In the nut shown in Figs. 1 and 2 the inner corner of the recess 3 is bounded by an oblique surface 4, extending round the said recess. In the shown position of the inner member 2, which is determined by the member 2 bearing against the surface 4, the screw-threads of one of the members constitute a continuation of the screw-threads of the other member, so that the members can be screwed on the bolt 8 simultaneously. The height of the inner member 2 is so adapted, that the bearing surface of the member is located for a short distance outside the bearing surface of the outer member. A groove 5 is provided in the inner side of the outer member 1 and a ridge 6 on the outer side of the inner member. The ridge may however be provided on the outer member and the groove in the inner member. A plurality of such ridges and grooves may, if necessary, be provided, for instance two ridges and two grooves located diametrically opposite to one another.

While the combined nut is screwed on the bolt the member 2 accompanies the member 1 in consequence of the engagement between the ridge 6 and the groove 5, until member 2 has been forced against the counter-member 9. Member 2 is thereby stopped, while member 1 is turned through a further distance, during which movement the side of the groove 5 is forced against the ridge 6 and caused to slide up the same, the members 1 and 2 being thereby locked to one another. At the same time the screw-threads of the member 1 are moved with relation to the screw-threads of the member 2 longitudinally of the opening of the nut, which results in the member 1 being locked to the screw-bolt, so that unscrewing of the combined nut at shocks or the like, is prevented in the most reliable manner. The combined nut is thus locked in its tightened position partly by the friction of the member 1 against the screw-threads of the bolt, partly by the frictional engagement of the ridge and the groove, in consequence whereof there is a double guarantee of the nut being inadvertently untightened. As the combined nut is untightened intentionally the friction between the screw-threads of the member 1 and the bolt ceases simultaneously with the interruption of the frictional engagement between the ridge and the groove, the screw-threads of the members being at the same time brought into the same mutual position occupied by the same before the nut was tightened. The opposite side of the groove now bears against the ridge, so that the outer member unscrews the inner member.

Preferably the distance for which the inner member extends outside the outer member, as shown in Fig. 1, is so adapted, that, as the combined nut is tightened on the screw-bolt and the inner member has been stopped in its motion by its friction with the counter-member, while the outer member is rotated through a further distance, the inner edge of the member 2 is forced into the surface 4, so that the lower side of the member 1 is forced against the counter-member. The same result may be gained by providing the inner side of the member 2 with one or more projections or for instance with a ridge 7, Fig. 3, extending round the member. At the tightening of the combined nut the ridge 7 is forced into the material of the outer member, and, it may be, deformed.

I claim:

A self-locking nut including in combination a threaded bolt, two undivided inner and outer nut members for engagement with the bolt, one of said members being provided with a recess for slidably accommodating the other member, a deformable bearing part on one of said members for holding the last mentioned member in such position that it normally extends a short distance outside the outer member, a projection on the engaging side wall of one of said members, the engaging side wall of the other of said members having a recess for normally accommodating the projection, said projection and the last mentioned recess together with the said deformable bearing part at the tightening of the nut causing the inner member to accompany the outer member until the inner member has been forced against the piece to be fastened and stopped while further tightening causes the projection to leave the recess and contact with the engaging wall of the adjacent member to lock the members to each other and the pressure between the members, resulting from the deformable part effects an increased pressure between the screw-threads of the members and those of the bolt.

In testimony whereof, I have signed my name to this specification.

HELGE GUSTAF LUDVIG KOLTHOFF.